(12) United States Patent
Chang et al.

(10) Patent No.: US 8,056,216 B2
(45) Date of Patent: Nov. 15, 2011

(54) METHOD OF MANUFACTURING NON-BACKLIGHTED ILLUMINATING KEYPAD

(75) Inventors: Yu-Chih Chang, Taoyuan (TW); Chang-Li Liu, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 659 days.

(21) Appl. No.: 12/189,403

(22) Filed: Aug. 11, 2008

(65) Prior Publication Data
US 2009/0241338 A1   Oct. 1, 2009

(30) Foreign Application Priority Data

Apr. 1, 2008   (TW) ................ 97111878 A

(51) Int. Cl.
*H01H 11/00* (2006.01)
*H01H 65/00* (2006.01)

(52) U.S. Cl. ............... 29/622; 29/846; 29/874; 29/876; 29/881; 362/26; 362/30; 362/616

(58) Field of Classification Search ............ 29/622, 29/825, 835, 846, 848, 874, 876, 881, 887; 40/437, 454, 491; 200/310, 313, 314, 406; 264/135, 246, 554; 362/26, 27, 30, 85, 616
See application file for complete search history.

(56) References Cited

U.S. PATENT DOCUMENTS

| | | | |
|---|---|---|---|
| 3,660,919 A * | 5/1972 | Nagel | 40/491 |
| 7,064,288 B2 * | 6/2006 | Nam | 200/406 |
| 7,182,907 B2 * | 2/2007 | Shimizu et al. | 264/554 |
| 2008/0037765 A1 | 2/2008 | Finney et al. | |
| 2008/0179173 A1 * | 7/2008 | Jung et al. | 200/314 |

FOREIGN PATENT DOCUMENTS

TW          M322027          11/2007

* cited by examiner

*Primary Examiner* — Thiem Phan
(74) *Attorney, Agent, or Firm* — Chun-Ming Shih; HDLS IPR Services

(57) ABSTRACT

A method of manufacturing non-backlighted illuminating keypad includes preparing a transparent plastic thin plate; forming a plurality of keycaps on a surface the plastic thin plate; forming a light gathering layer on another surface of the plastic thin plate opposite to the keycaps; attaching the plastic thin plate onto an electronic ink layer; and attaching an first elastic layer on the electronic ink layer.

15 Claims, 20 Drawing Sheets

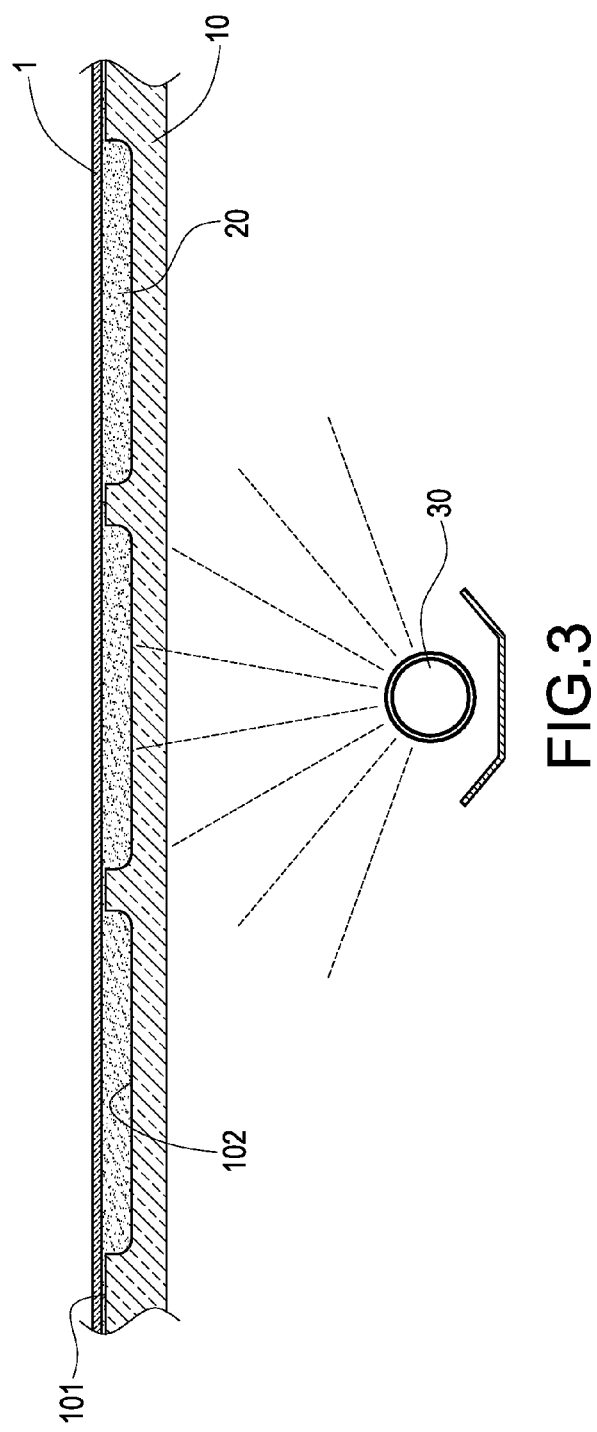
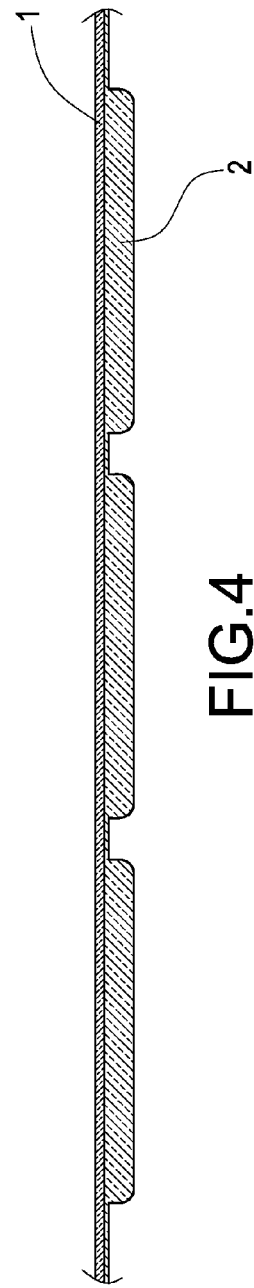
FIG.3
FIG.4

METHOD OF MANUFACTURING NON-BACKLIGHTED ILLUMINATING KEYPAD

BACKGROUND OF THE INVENTION

1. Field of the Invention

The present invention relates to method of manufacturing a keypad, in particular to a method of manufacturing a non-backlighted illuminating keypad.

2. Description of Related Art

Backlight module is extensively used as a light source in liquid crystal display, advertising apparatus and portable electronic devices. In a portable electronic device such as cellular phone or personal digital assistant (PDA), the light source is often arranged behind a keypad panel to provide light penetrated through the keypad panel to illuminate the numerals, characters or symbols on the keypad panel.

Conventional backlight module usually includes a light guide plate and a light emitting device (LED) used to emit light into the light guide plate. Light propagates in the light guide plate and diffuses from a surface of light guide plate to keys of the keypad panel, such that users can clearly identify the numerals, character or symbol printed on the surfaces of keys.

Electronic ink techniques are already employed to electronic display apparatus to show information. The electronic ink material includes a plurality of microcapsules each contains both white and black particles in a microcapsule wall. The electronic ink microcapsules are printed on an electrode substrate, which can generate electrical field to control the behaviors of the white and black particles in the microcapsules. By controlling the behaviors of those colored particles in each microcapsule, it is possible to get macroscopic images from the microcapsules printed on the electrode substrate.

Therefore, the electronic ink techniques seem promising to use in a keypad, thus replacing the numerals, characters and symbols printed on the surfaces of keys. However, since the electronic ink material is not transparent, it cannot employ conventional backlight module for illuminating the electronic ink material to display the numerals, characters or symbols and requires an appropriate accompanying light-source module to compose a practical keypad.

SUMMARY OF THE INVENTION

The present invention is to provide a method of manufacturing non-backlighted illuminating keypad. The keypad is capable of displaying numerals, characters and symbols by controlling the behaviors of colored particles in electronic ink microcapsules. Besides, a light gathering layer is formed above the electronic ink layer to gather light to illuminate an electronic ink layer. Therefore, images formed by electronic ink layer can be clearly viewed by users.

In order to achieve aforementioned purpose, the present invention provides a method of manufacturing non-backlighted illuminating keypad comprising: preparing a transparent plastic thin plate; forming a plurality of keycaps on a surface of the plastic thin plate; forming a light gathering layer corresponding to the keycaps on another surface of the plastic thin plate; attaching the plastic thin plate onto a surface of an electronic ink layer; and attaching a first elastic layer on another surface of the electronic ink layer.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

FIG. 3 is a perspective view of irradiating ultraviolet light through the transparent mold;

FIG. 4 is a cross-sectional view of a keypad panel obtained according to the method of the present invention;

FIG. 12 is perspective view of a light source of the keypad panel lighting on;

DETAILED DESCRIPTION OF THE INVENTION

A detailed description of the present invention will be made with reference to the accompanying drawings.

Figure 1:
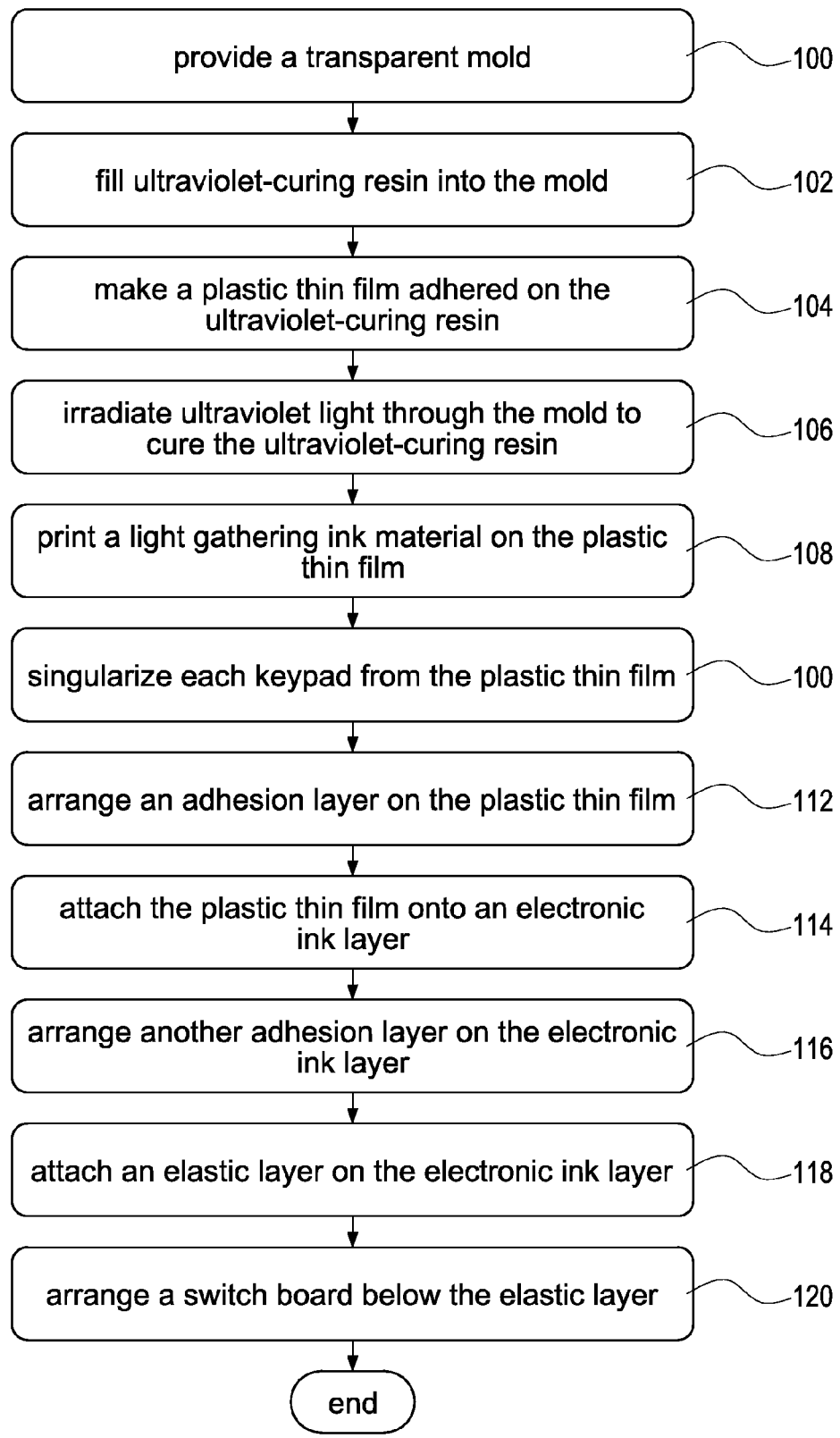
FIG. 1 is a flow chart of the manufacturing the keypad of the present invention.
Figure 2:
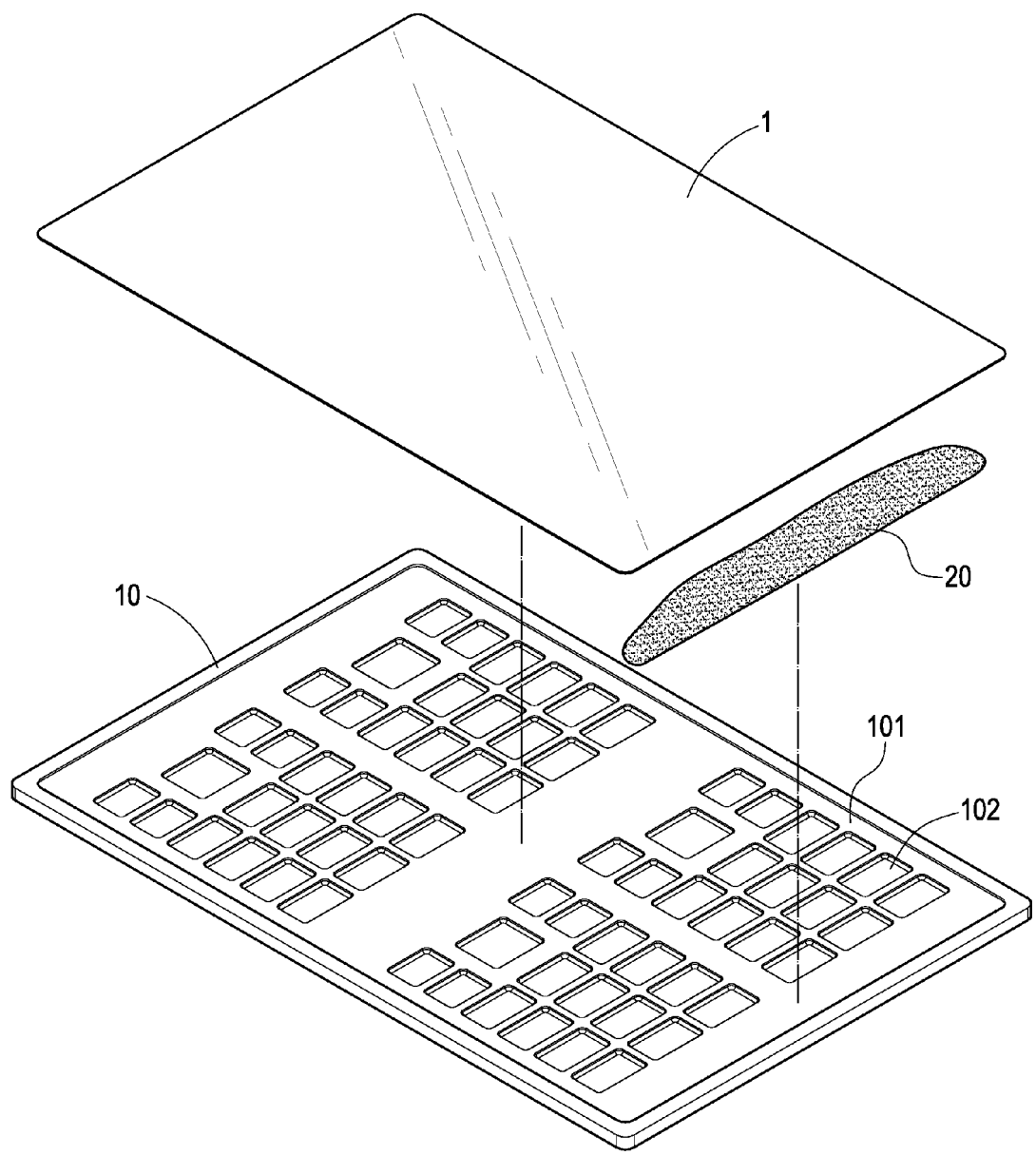
FIG. 2 is a perspective view of a plastic thin plate arranging on a transparent mold.

FIG. 1 shows a flow chart of the manufacturing a non-backlighted illuminating keypad according to a preferred embodiment of the present invention. In step 100, a transparent mold 10 is provided as shown in FIG. 2. The mold 10 includes a first mold cavity layer 101 and a plurality of second mold cavity layers 102 arranged in a matrix form.

In step 102, as FIG. 2 shows, ultraviolet-curing resin 20 is provided to completely fill into the first mold cavity layer 101 and the second mold cavity layers 102 of the mold 10.

In step 104, a transparent plastic thin plate 1 is provided and attaches onto the inner surface 101 of the mold 10, and makes the ultraviolet-curing resin 20 in the mold cavities 102 adhered on the plastic thin plate 1. Then, the plastic thin plate 1 is scratched toward the mold 10 to squeeze out air and residual ultraviolet-curing resin 20 material between the plastic thin plate 1 and the mold 10.

In step 106, as illustrate in FIG. 3, an ultraviolet light source 30 is provided to irradiate ultraviolet light through the transparent mold 10 to cure the ultraviolet-curing resin 20 in the transparent mold 10. After removing the plastic thin plate 1 from the transparent mold 10, a plurality of keycaps 2 are formed on the plastic thin plate 1 as FIG. 4 shows.

Figure 5:
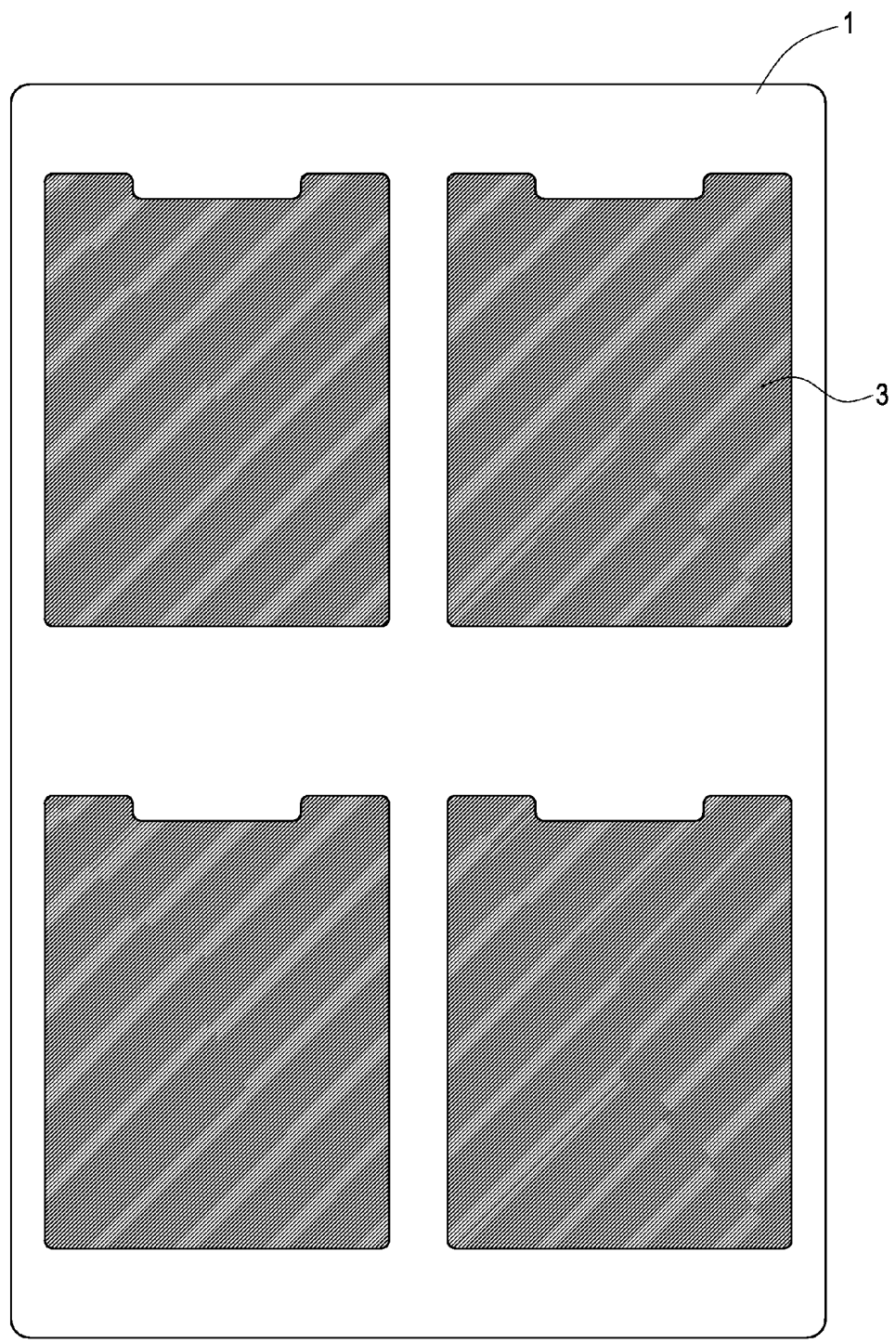
FIG. 5 is a top view of a light gathering layer arranging on the plastic thin plate.

In step 108, a light gathering ink material is printed on a surface of the plastic thin plate 1 opposite to the keycaps 2 to form a light gathering layer 3. As FIG. 5 shows, the pattern of the light gathering layer 3 is formed corresponding to the keycaps 2. The light gathering layer 3 is made of light gathering ink material comprising resin and titanium dioxide.

Figure 6:
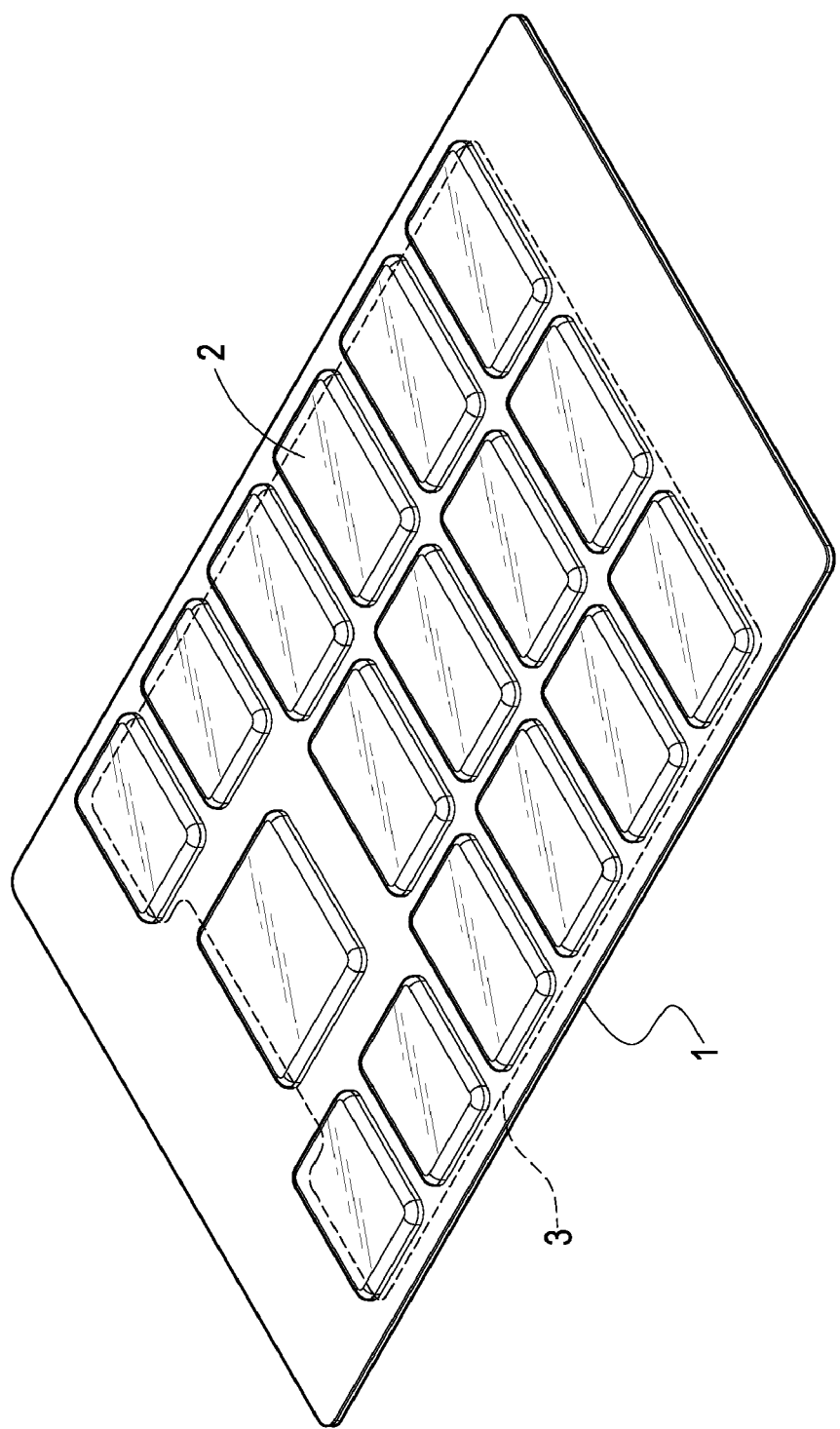
FIG. 6 is a perspective view of keypad panel of the present invention.
Figure 7:
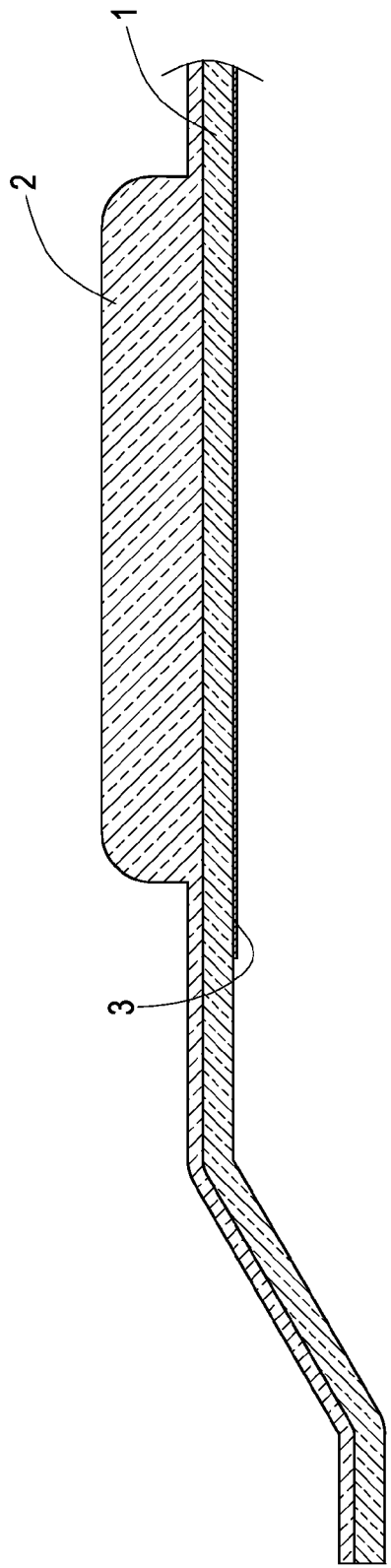
FIG. 7 is a cross-sectional view of a keypad panel in FIG. 6.

In step 110, each keypad panel is singularized as illustrate in FIGS. 6 and 7 from the plastic thin plate 1 in FIG. 5. As FIGS. 6 and 7 show, the keypad panel includes a plastic thin plate 1, keycaps 2 formed on a top surface of the plastic thin plate 1 and light gathering layer 3 formed on a bottom surface of the plastic thin plate 1.

Figure 8:
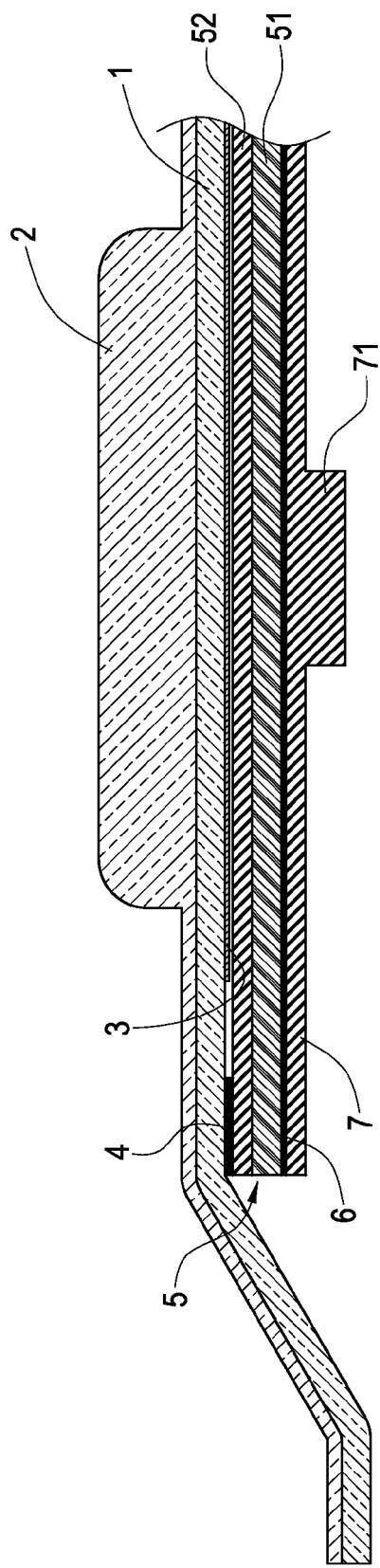
FIG. 8 is a perspective view of keypad of the present invention.

In step 112, as illustrate in FIG. 8, an adhesion layer 4 is arranged on the bottom surface of the plastic thin plate 1 where the light gathering layer 3 is not arranged. The adhesion layer 4 may be adhesive agent or double-sided adhesive tape.

In step 114, the plastic thin plate 1 is attached onto an electronic ink layer 5 by the adhesion layer 4. The electronic ink layer 5 includes an electrode substrate 51 and an electronic ink material 52 printed on the top surface of the electrode substrate 51. The electrode substrate 51 includes a plurality of electrode traces (not shown) having patterns such as numerals, characters and symbols (#, *, etc). The electronic ink material 52 includes a plurality of microcapsules (not shown) each having both white and black particles inside. After the electrode traces are electrically charged, the behaviors of particles inside the microcapsules will changed, and then the desired images are formed by the microcapsules of the electronic ink material 52. Since the electronic ink layer 5 is well known by those of ordinary skill in the art, the details thereof will not be described herein.

In step 116, another adhesion layer 6 is arranged on the bottom surface of the electrode substrate 51. The adhesion layer 6 may be adhesive agent or double-sided adhesive tape.

In step 118, attach a first elastic layer 7 on the bottom surface of the electrode substrate 51 of the electronic ink layer 5 by the adhesion layer 6. The first elastic layer 7 includes a plurality of protrusion portions 71 respectively corresponding to the keycaps 2.

In step 120, as illustrate in FIG. 9, a switch board 8 is arranged below the first elastic layer 7. The switch board 8 includes a printed circuit board 81 and a second elastic layer 82 arranged on the printed circuit board 81. The second elastic layer 82 includes a plurality of metal domes 821. The printed circuit board 81 includes a plurality of electrical contacts 811 corresponding to the metal domes 821. The switch board 8 also includes a thin film 83 covered on the printed circuit board 81 and the metal domes 821, and a light source 84 electrically connected to the printed circuit board 81. The thin film 83 includes a plurality of convex portion 831 corresponding to the protrusion portions 71 of the first elastic layer 7. As illustrate in FIGS. 9 and 10, the light source 84 correspondingly located at a lateral side of the plastic thin plate 1. In the present embodiment, the light source 84 is a light emitting diode.

Figure 9:
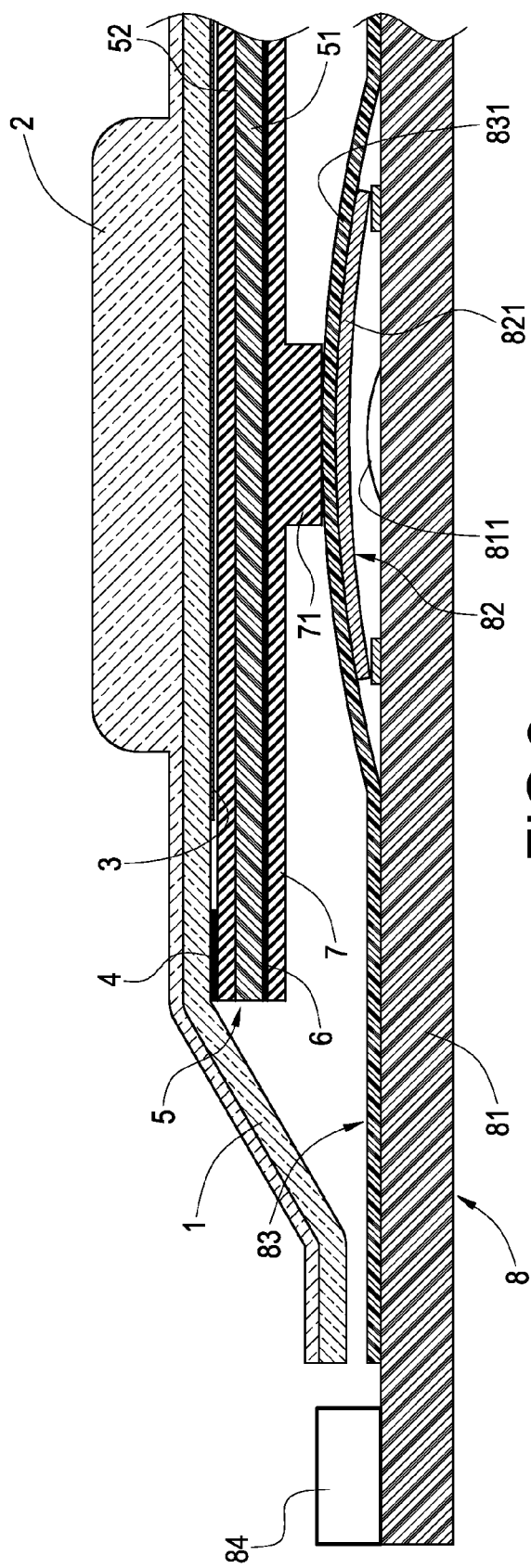
FIG. 9 is a cross-sectional view of keypad of the present invention.
Figure 10:
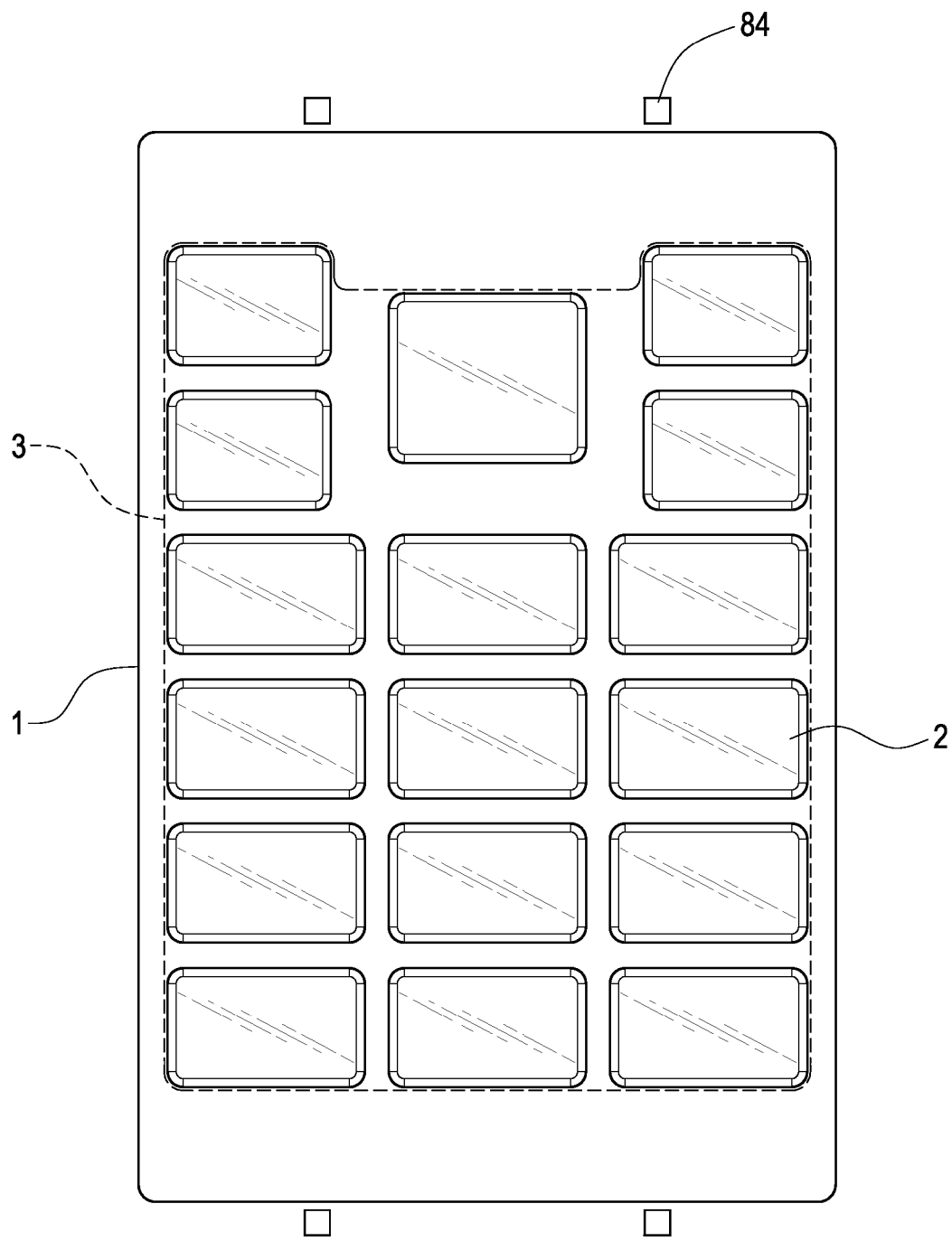
FIG. 10 is a top view of keypad of the present invention.
Figure 11:
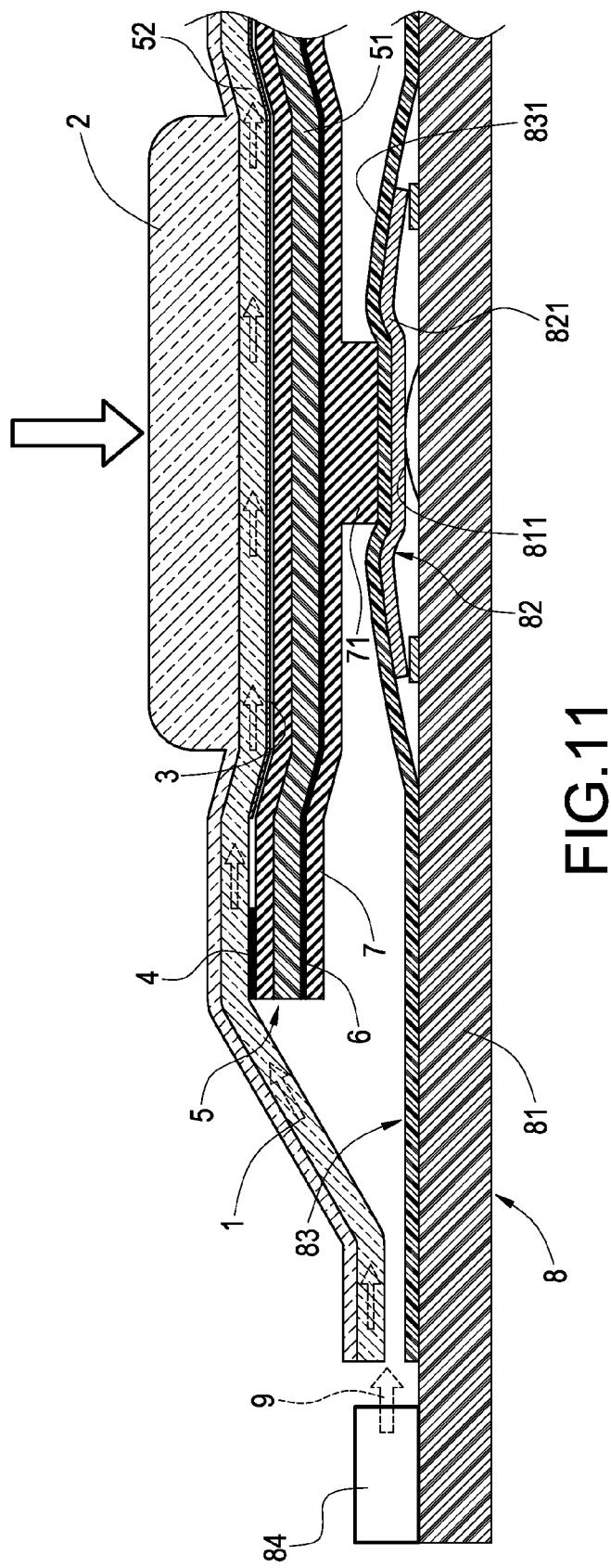
FIG. 11 is another cross-sectional view of keypad of the present invention.

Refer to FIGS. 9 and 11, when the keycap 2 is pressed by external force, the keycap 2 will downwardly press the light gathering layer 3, the electronic ink layer 5 and the first elastic layer 7, and then the protrusion portion 71 of the first elastic layer 7 will press the metal dome 82 to contact with the electrical contact 811, and then a connecting signal will be generated for output.

Figure 12:
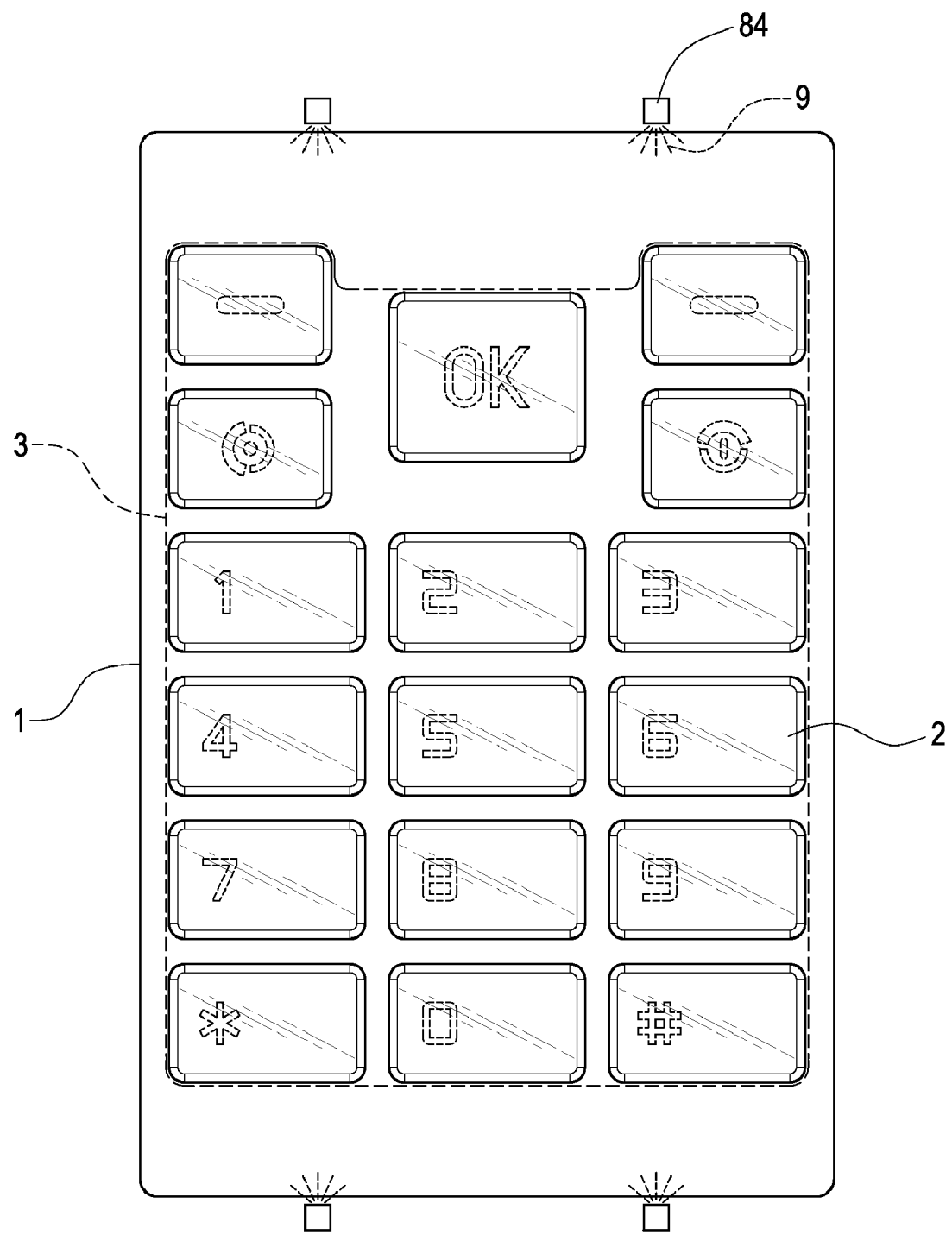

Refer to FIGS. 11 and 12, when the keycap 2 is pressed, the light source 84 on the printed circuit board 81 will be lighted on, light 9 emitted from the light source 84 enter the plastic thin plate 1 from the lateral side thereof. The light 9 is gathered around the light gathering layer 3 to illuminate the adjacent electronic ink material 52. At the same time, the electrode substrate 51 of the electronic ink layer 5 is electrically charged, the behaviors of particles inside the microcapsules are changed, and then the images of numerals, characters and symbols are formed by the electronic ink material 52. Therefore, users can clearly identify the pattern of each key and precisely press the right keycap 2.

Figure 13A:
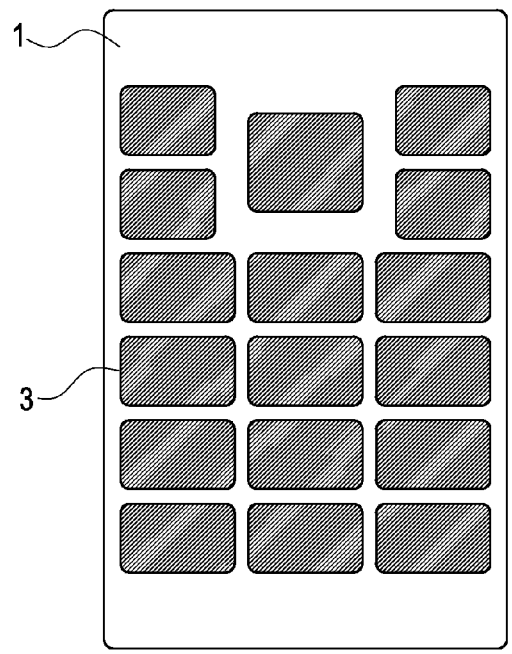
FIGS. 13(a) to 13(e) show different arrangements of a light gathering layer on a bottom surface of a carrier of the present invention.
Figure 13B:
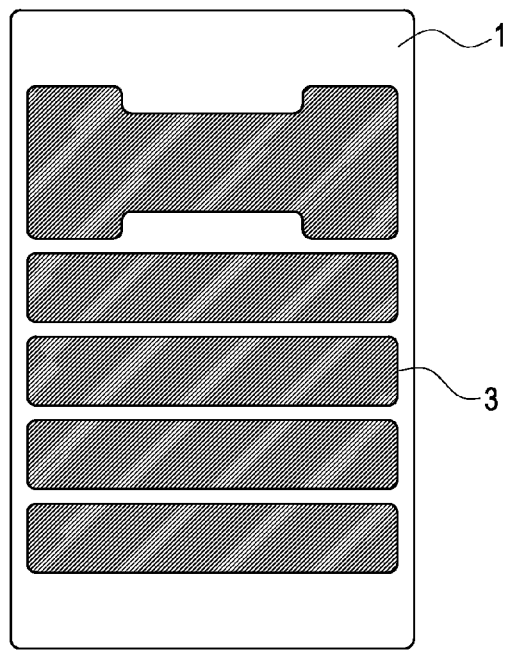
Figure 13C:
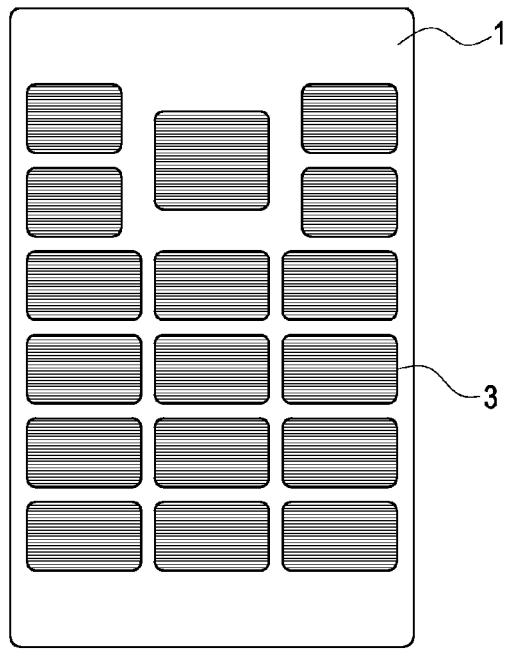
Figure 13D:
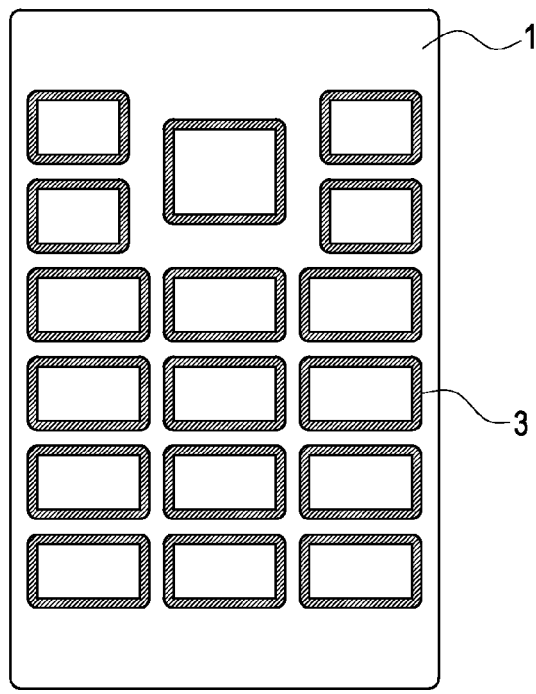
Figure 13E:
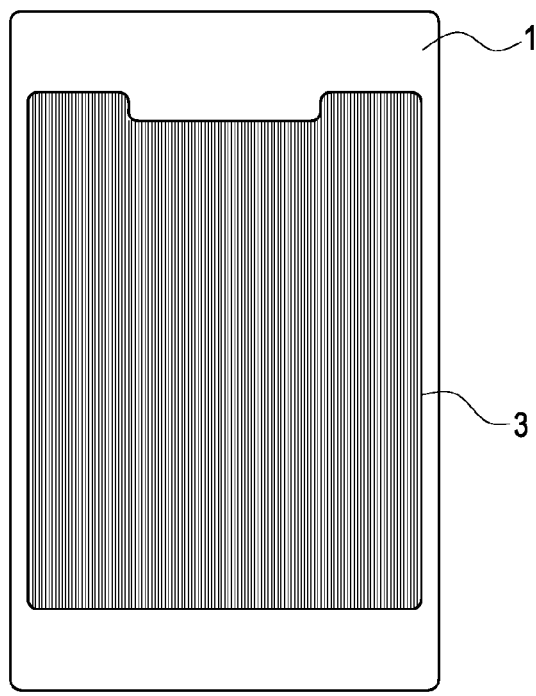
Figure 14:
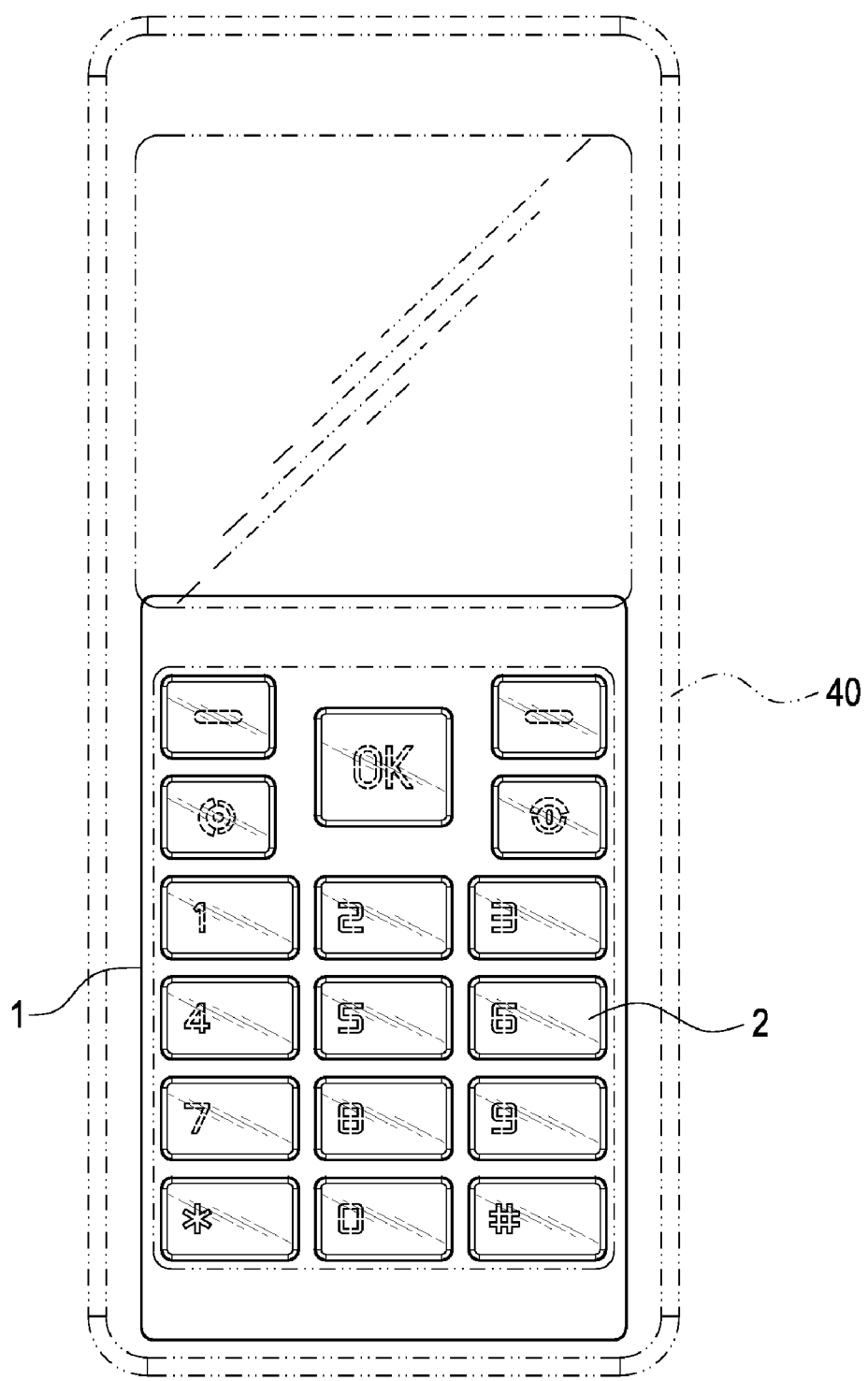
FIG. 14 is a schematic view showing the present invention being used in a mobile phone.
Figure 15:
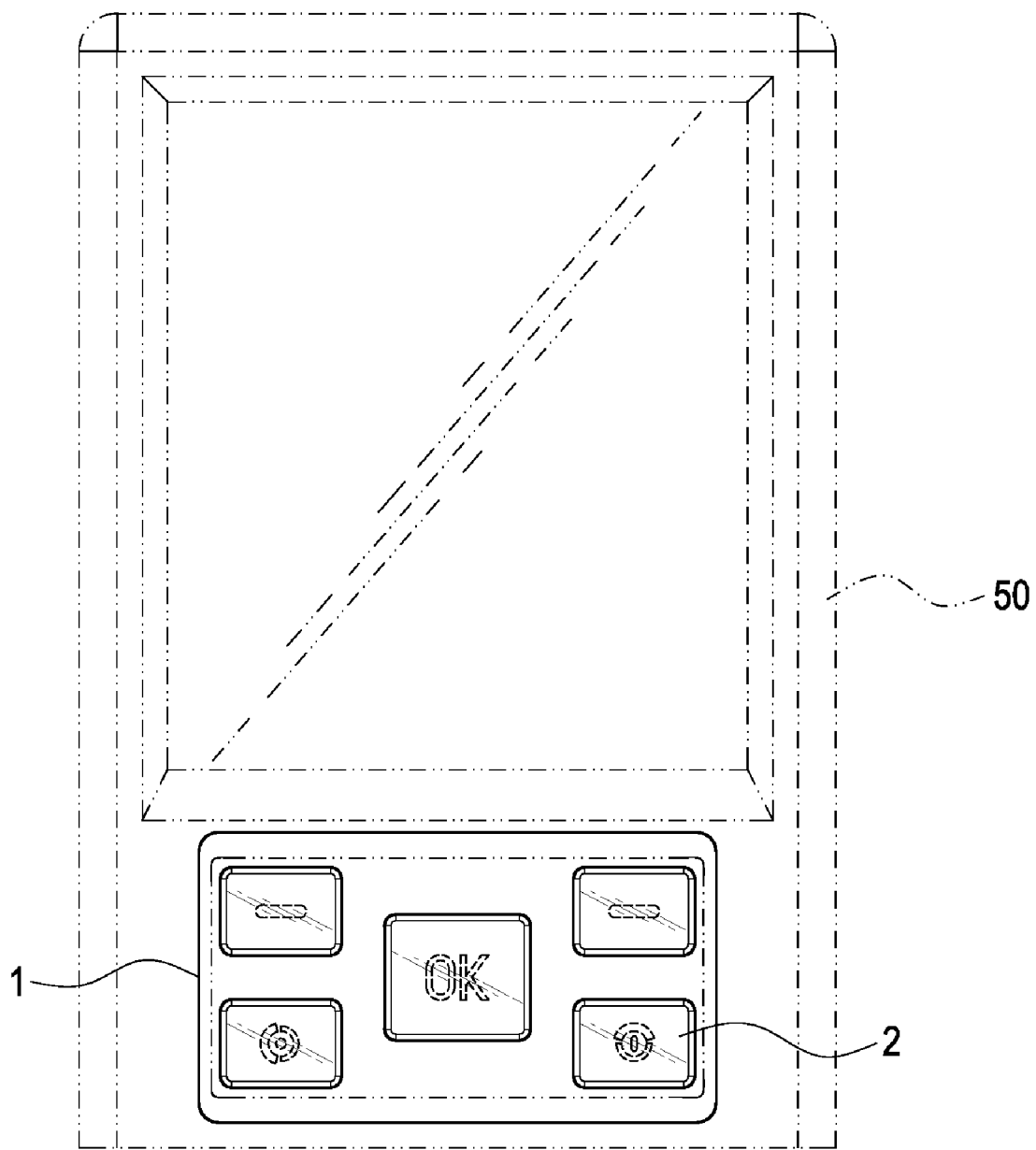
FIG. 15 is a schematic view showing the present invention being used in a personal digital assistant.
Figure 16:
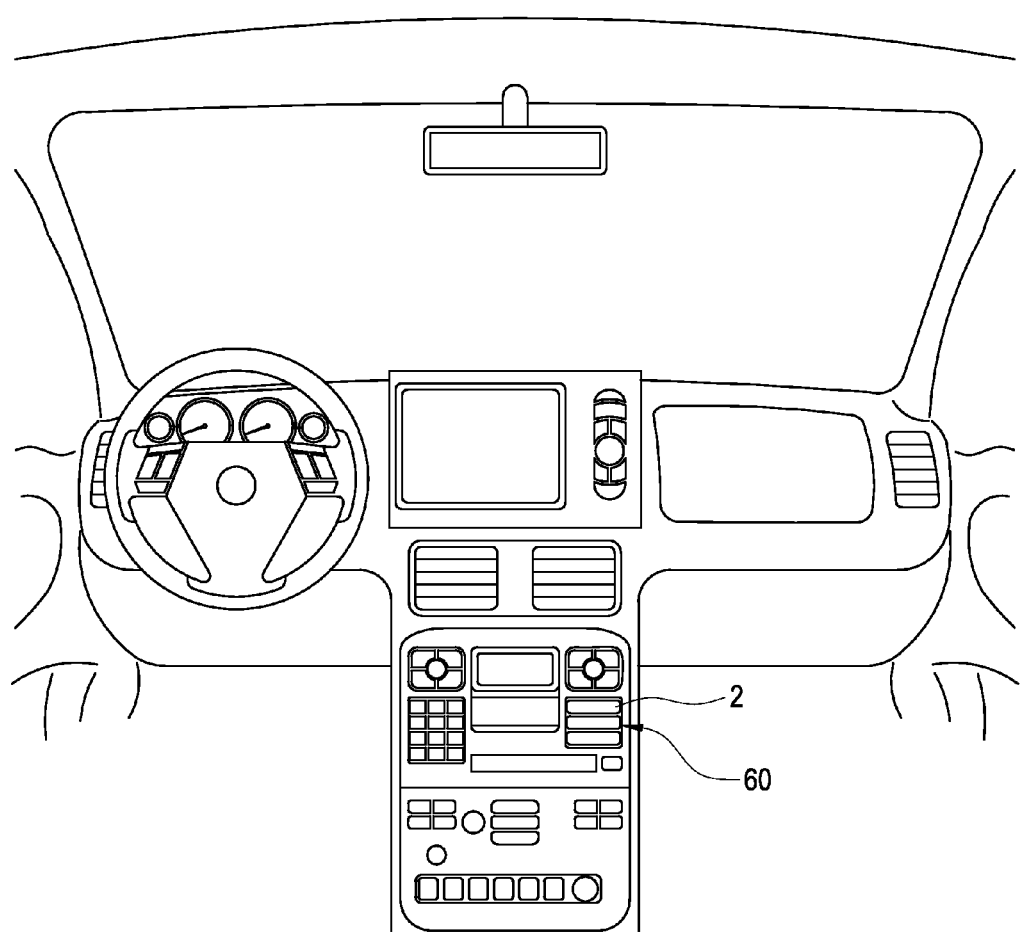
FIG. 16 is a schematic view showing the present invention being used in a car audio system.
Figure 17:
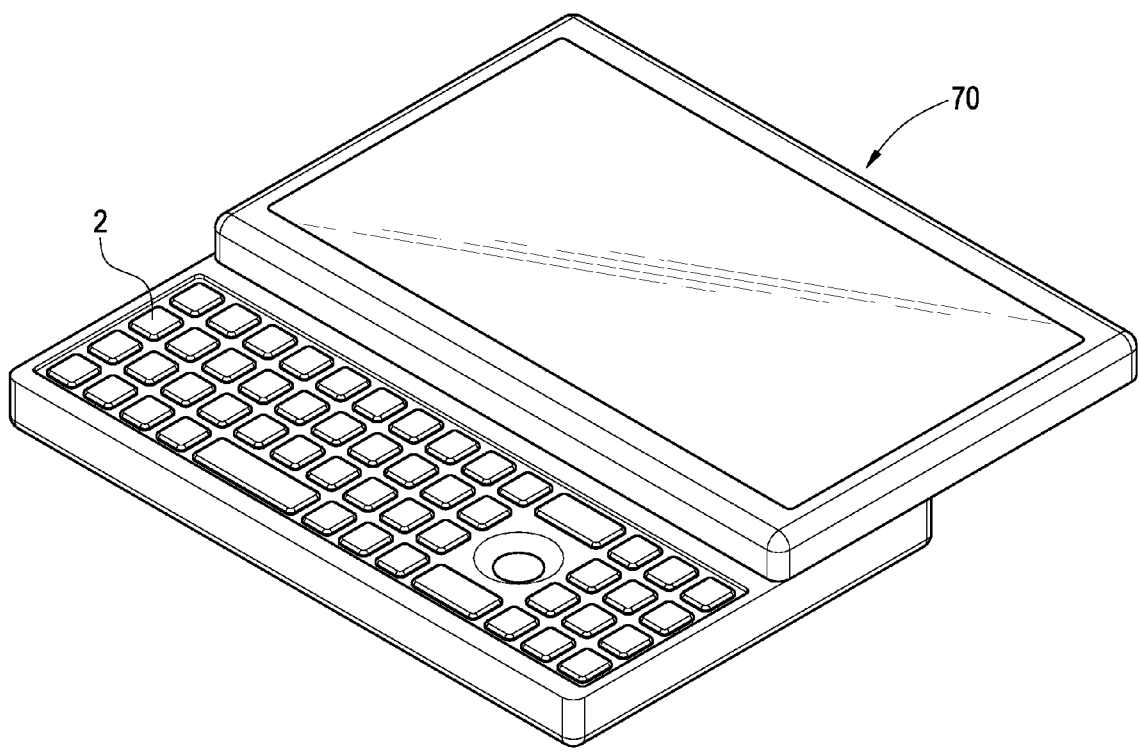
FIG. 17 is a schematic view showing the present invention being used in an ultra portable mobile computer.
Figure 18:
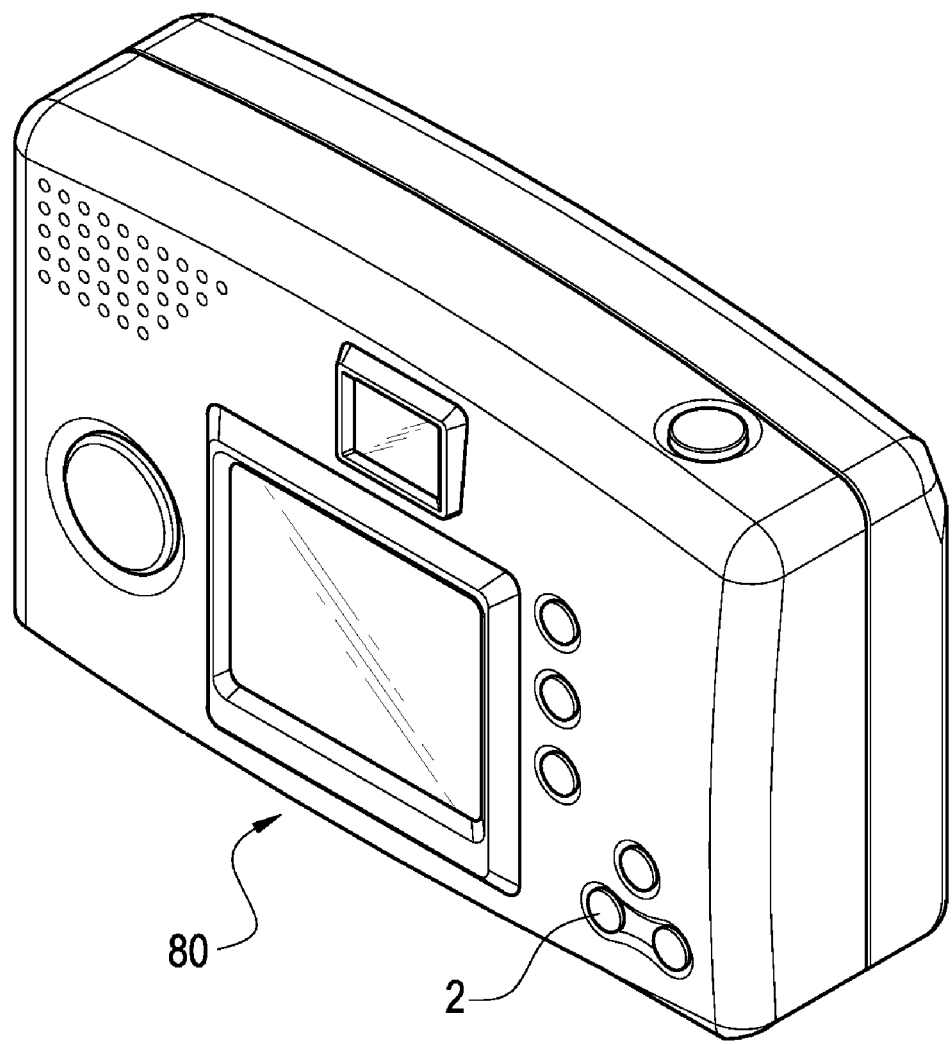
FIG. 18 is a schematic view showing the present invention being used in a camera.
Figure 19:
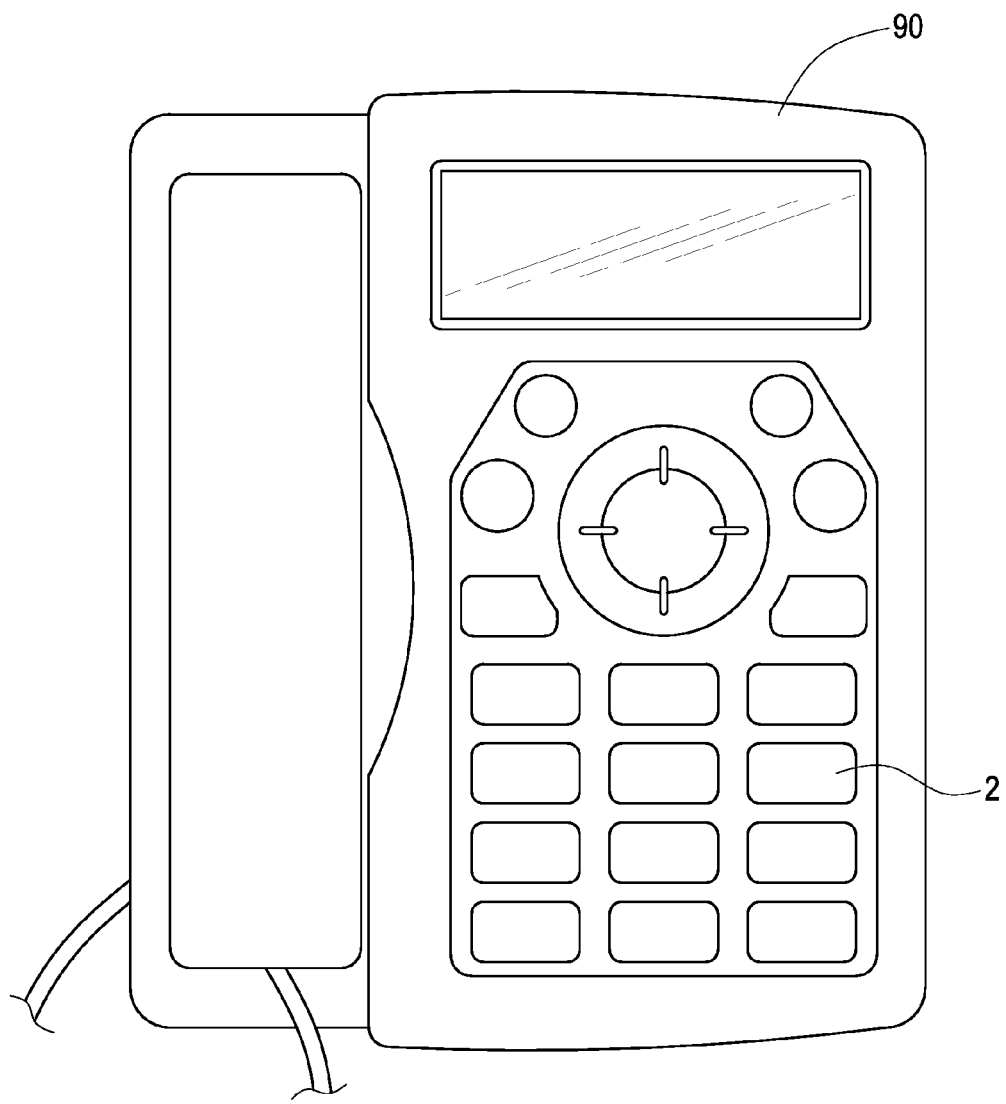
FIG. 19 is a schematic view showing the present invention being used in a desktop telephone.

Refer to FIGS. 13(a) to 13(e), they show five different arrangements of the light gathering layer of the present invention. The light gathering layer 3 in FIG. 13(a) is arranged according to locations of the keycaps. The light gathering layer 3 in FIG. 13(b) is arranged according to locations of another kind of stripe-like keycaps. Both light gathering layers 3 in FIGS. 13(a) and 13(b) have an obliquely line pattern. The light gathering layer 3 in FIG. 13(c) has a horizontal line pattern. The light gathering layer 3 in FIG. 13(d) printed along outlines of each keycap. The light gathering layer 3 in FIG. 13(e) has only one region covered all the keycaps and has vertical line pattern.

As FIGS. 14 to 19 show, a non-backlighted illuminating keypad manufactured according to the present invention can be respectively applied to a mobile phone 40, a personal digital assistant (PDA) 50, a car audio system 60, an ultra portable mobile computer (UMPC) 70, and a camera 80, a desktop telephone 90.

Figure 20:
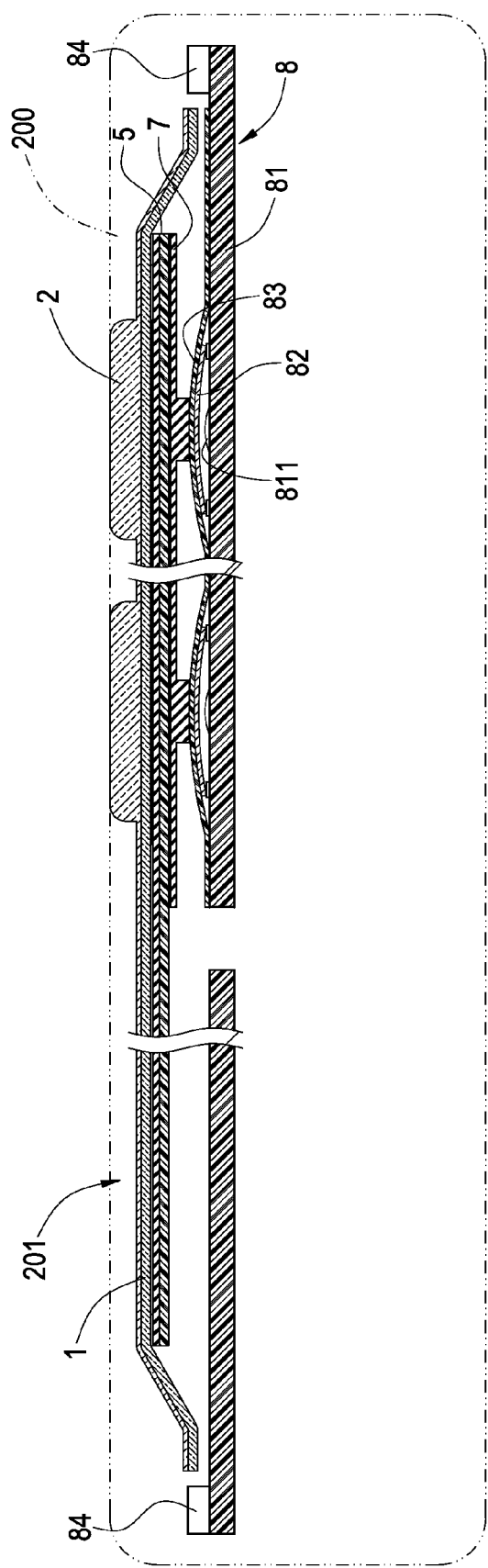
FIG. 20 is a cross-sectional view of another embodiment of the keypad of the present invention.
Figure 21:
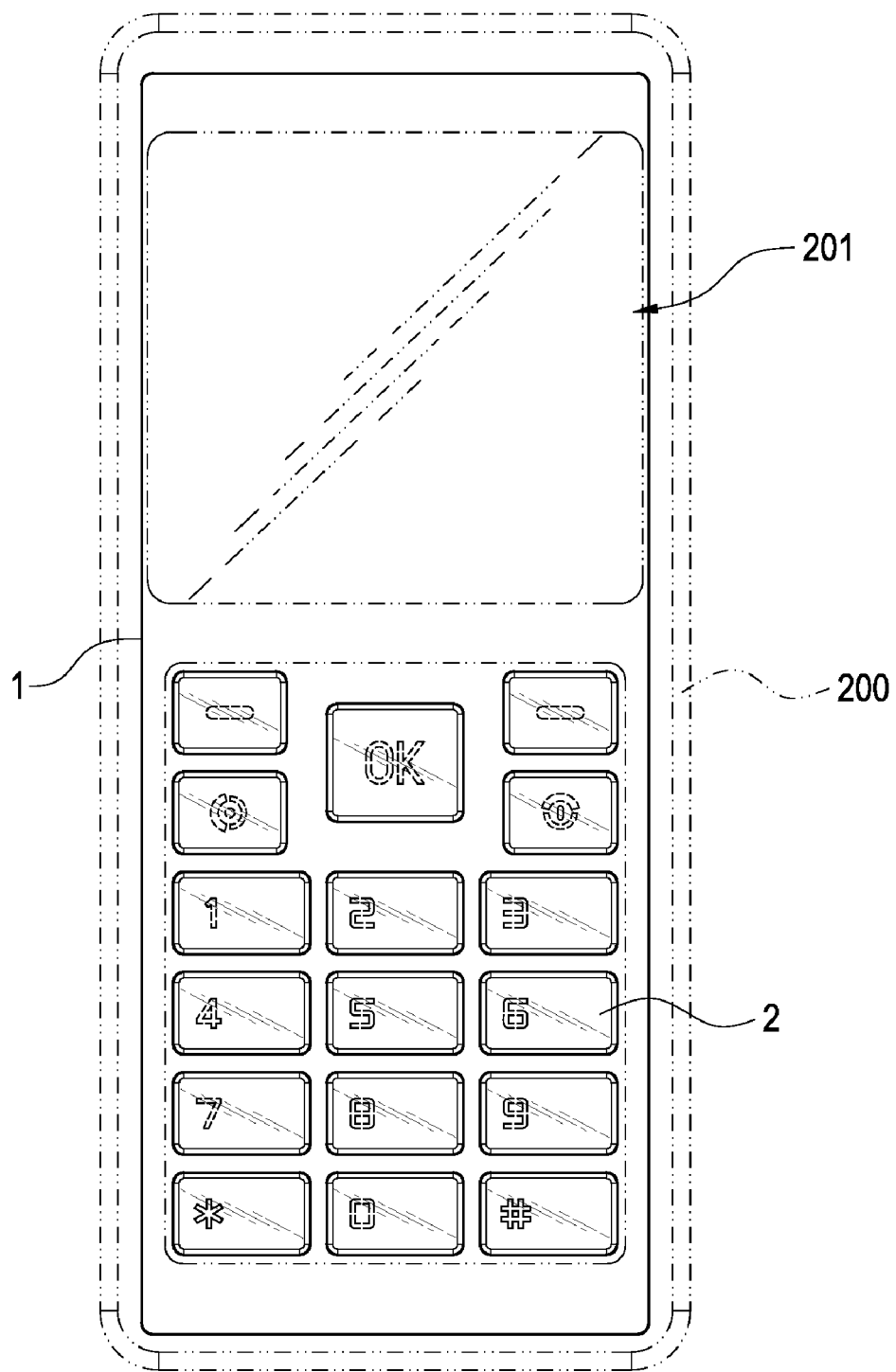
FIG. 21 is a top view of the keypad in FIG. 20.

Refer to FIGS. 20 and 21, besides, in another embodiment of the method of manufacturing keypad of the present invention, the electronic ink layer 5 further extend to the display region 201 of portable electronic apparatus 200 to further play a role of display module to show information of the numerals, characters or symbols.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method of manufacturing non-backlighted illuminating keypad, comprising:
   (a) preparing a transparent plastic thin plate;
   (b) forming a plurality of keycaps on a top surface of the plastic thin plate;
   (c) forming a light gathering layer corresponding to the keycaps on bottom surface of the plastic thin plate;
   (d) attaching the plastic thin plate onto a top surface of an electronic ink layer;
   (e) attaching a first elastic layer onto bottom surface of the electronic ink layer; and
   (f) providing a light source located at a lateral side of the plastic thin plate, so that light emitted from the light source enters the plastic thin plate from the lateral side thereof and is gathered around the light gathering layer to illuminate the electronic ink layer.

2. The method according to claim 1, wherein the step (b) comprises:

providing a transparent mold comprising a first mold cavity layer and a plurality of second mold cavity layers arranged in a matrix form;

filling ultraviolet-curing resin into the first mold cavity layer and the second mold cavity layers; and attaching the transparent plastic thin plate onto the transparent mold and making the ultraviolet-curing resin in the first mold cavity and the second mold cavities adhered on the plastic thin plate.

3. The method according to claim 2, wherein the step (b) further comprises:

irradiating ultraviolet light through the transparent mold to cure the ultraviolet-curing resin therein; and removing the plastic thin plate with the plurality of keycaps formed thereon from the transparent mold.

4. The method according to claim 1 wherein the light gathering layer in step (c) is made of light gathering ink material comprising resin and titanium dioxide.

5. The method according to claim 1, wherein the plastic thin plate in step (d) is attached onto the electronic ink layer through an adhesion layer, and the adhesion layer is arranged on the opposite surface of the plastic thin plate where the light gathering layer is not arranged.

6. The method according to claim 5, wherein the adhesion layer is adhesive agent or double-sided adhesive tape.

7. The method according to claim 1, wherein the electronic ink layer comprises an electrode substrate and an electronic ink material printed on the electrode substrate in step (d).

8. The method according to claim 1, wherein the first elastic layer in step (e) is attached to the electronic ink layer by an adhesion layer.

9. The method according to claim 8, wherein the adhesion layer is adhesive agent or double-sided adhesive tape.

10. The method according to claim 1, wherein the first elastic layer in step (e) comprises a plurality of protrusion portions respectively corresponding to the keycaps.

11. The method according to claim 1, further comprising a step (f) of arranging a switch board below the first elastic layer.

12. The method according to claim 11, wherein the switch board comprises a printed circuit board, a second elastic layer arranged on the printed circuit board, and a thin film covered on the printed circuit board and the second elastic layer, wherein the thin film comprises a plurality of convex portion corresponding to the protrusion portions of the first elastic layer.

13. The method according to claim 12, wherein the second elastic layer comprises a plurality of metal domes.

14. The method according to claim 12, wherein the light source is electrically connected to the printed circuit board.

15. The method according to claim 14, wherein the light source is a light emitting diode.

* * * * *